Sept. 15, 1964 R. P. MASSEY 3,149,291

TRANSISTOR CORE CONVERTER WITH CURRENT FEEDBACK

Filed Oct. 6, 1960 2 Sheets-Sheet 1

INVENTOR
R. P. MASSEY
BY V. P. Priolo
ATTORNEY

Sept. 15, 1964 R. P. MASSEY 3,149,291

TRANSISTOR CORE CONVERTER WITH CURRENT FEEDBACK

Filed Oct. 6, 1960 2 Sheets-Sheet 2

INVENTOR
R. P. MASSEY

BY V. P. Priolo

ATTORNEY 3,149,291
Patented Sept. 15, 1964

3,149,291

TRANSISTOR CORE CONVERTER WITH CURRENT FEEDBACK

Richard P. Massey, Westfield, N.J., assignor to Bell Telephone Laboratories, Incorporated, New York, N.Y., a corporation of New York Filed Oct. 6, 1960, Ser. No. 60,874
5 Claims. (Cl. 331—113)

This invention relates to power supply systems and, more particularly, to a system for converting direct current to alternating current which, in turn, may be rectified.

In many electrical and electronic systems ranging in scope from high fidelity audio to guided missiles it is important to employ power systems which employ direct current and supply it at a constant magnitude to a given load. Such power supply systems must possess an extremely high degree of reliability with a relatively high order of absolute current stabilization. Power supply systems of the transistor core converter type which are small, light, efficient and require no maintenance, possess the required degree of reliability and stability and, therefore, qualify for broad application.

A converter circuit generally employs a plurality of transistors and a saturable transformer for converting direct current to alternating current which, in turn, may be rectified. The transistors function as automatic switches, i.e., conductive or nonconductive, to complete circuits for supplying current from a direct-current source to a portion of a transformer winding alternately in opposite directions. Each circuit is usually completed through a single transistor switch in series with the direct-current supply source with either current or voltage feedback employed to control the switching time of the transistors. During the switching interval of the transistor, the saturable transformer is in the saturation region thus presenting a low impedance to the circuit which, in turn, tends to hold the previously "off" transistor off and to turn the previously "on" transistor off. This interval in the switching time produces large ripple output voltages, thus resulting in decreased efficiency and limited frequency of oscillation.

In many applications current feedback rather than voltage feedback is desired in order to provide: Better output regulation and efficiency in the full no-load to full-load range; self-starting under heavy loading conditions and where multiple output windings are desired; and reduced transistor overdrive and excessive transient dissipation in order to improve efficiency and reliability particularly for variable loads.

The major disadvantage of the current feedback structures of the prior art is the need for a current feed-back transformer in addition to a power transformer. This requirement adds weight to the converter and increases the unit cost.

It is, therefore, an object of this invention to provide a current feedback converter which does not include a feedback transformer.

Another object of this invention is to provide a converter configuration with reduced transistor switching time.

Another object of this invention is to provide a converter configuration with output voltage independent of the transistor inverse voltage ratings.

Another object of this invention is to provide a converter configuration with multiple output windings using a single transformer.

A feature of this invention resides in the use of the inherent transistor emitter-base asymmetrically conducting property to provide direct-current conversion.

Another feature of this invention resides in the use of capacitors in a converter output circuit which provide the dual function of filtering and energy storage to reduce the sum of the storage and decay or turn-off time of the previously "on" transistor.

Other objects and features of the present invention will become apparent upon consideration of the following detailed description when taken in connection with the accompanying drawings in which.

Figure 1:
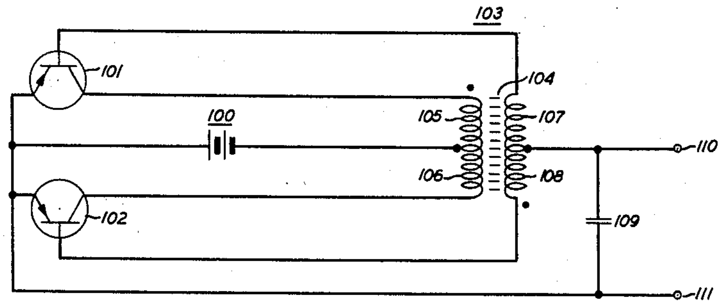
FIG. 1 is a schematic representation of an electrical circuit comprising a common emitter embodiment of the invention.

Referring now to FIG. 1 of the drawing there is provided a direct-current supply source 100, p-n-p transistors 101 and 102, capacitor 109 and a transformer 103 with winding portions 105, 106, 107 and 108 wound on a core 104 of saturable magnetic material preferably having a high permeability and a substantially rectangular hysteresis loop. Terminals 110 and 111 are output terminals.

The emitter electrodes of transistors 101 and 102 are tied to one terminal of the input direct-current supply source 100. The other terminal of the input source 100 is connected to the common terminal of winding portions 105 and 106. The other terminals of winding portions 105 and 106 are connected to the collector electrodes of transistors 101 and 102, respectively. The common terminal of winding portions 107 and 108 is connected to the output terminal 110. The other terminals of winding portions 107 and 108 are connected to the base electrodes of transistors 101 and 102, respectively. Output terminal 111 is connected to the emitter electrodes of transistors 101 and 102. Capacitor 109 is connected across the output terminals 110 and 111.

Although this configuration uses only p-n-p transistors, it should be understood that n-p-n transistors could be used equally as effectively.

Since, as mentioned previously, current feedback circuits are inherently self-starting let us assume that transistor 101 is conducting while transistor 102 is cut off. Current flows from the direct-current supply source 100 through the collector-emitter path of transistor 101 into the dot of winding portion 105 and back to the direct-current supply source 100. Tracing the induced voltages with the aid of the dot convention, it is noted that the asymmetrically conducting emitter-base junction of transistor 101 is poled into conduction thus providing a path for impressing the voltage induced in winding portion 107 across capacitor 109. Note that the output terminal 110 will be at a positive potential with respect to the output terminal 111. Current will continue to flow through winding portion 105 until the saturable core 104 of transformer 103 saturates. At saturation no further voltage is induced in winding 107, transistor 101 is cut off and transistor 102 is poled into conduction. Current now flows from the direct-current supply source 100 through the collector-emitter path of transistor 102 out of the dot and winding portion 106 and back to the direct-current supply source 100. Once again tracing the induced voltages with the aid of the dot convention, it is now noted that the asymmetrically conducting emitter-base junction of transistor 102 is poled into conduction thus providing a path for impressing the voltage induced in winding portion 108 across capacitor 109. Note that, as before, the output terminal 110 is positive with respect to the output terminal 111. Current will continue to flow in winding portion 106 until the core 104 again saturates turning on transistor 101 and turning off transistor 102. The cycle then continuously repeats itself until the direct-current supply source 100 is removed.

It should be noted that the capacitor 109 provides the dual function of filtering and energy storage to reduce the sum of the storage and decay or turn-off time of the previously saturated "on" transistor. During the switching interval, the transformer 103 is saturated and presents a low impedance to the circuit. The voltage appearing across output terminals 110 and 111 which cannot change instantaneously is, therefore, applied as an inverse voltage to the emitter-base junctions of transistors 101 and 102 thus tending to hold the previously "off" transistor off and turning the previously "on" transistor off more rapidly. The saturated inductance of the primary winding of the transformer still provides the energy storage necessary to turn on the previously "off" transistor and thereby maintain oscillation. The reduction in the turn-off time indirectly implies a reduction in the turn-on time since when the rate at which current is decreasing is speeded up the switching time is reduced. The reduction in switching time results in minimum output ripple voltage and either the overall conversion efficiency or the frequency of oscillation may be increased which, in turn, permits a reduction in the size and weight of the transformer.

Figure 2:
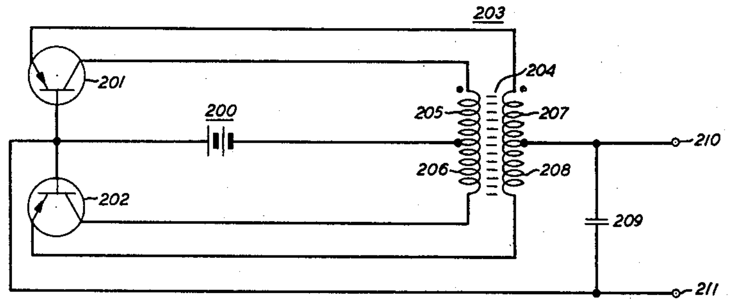
FIGS. 2 and 3 are schematic representations of electrical circuits comprising the common base and common collector embodiments, respectively, of the invention.
Figure 3:
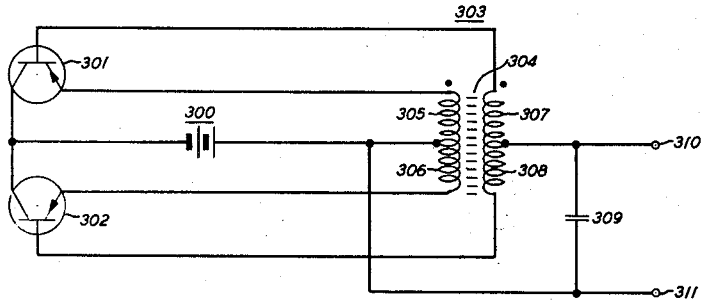

FIGS. 2 and 3 are second and third embodiments of the invention wherein transistors are connected in the common base and common collector configurations, respectively. The designation numerals of FIGS. 2 and 3 are identical to those of FIG. 1 except that the first digit has been changed to correspond to the figure number. Because the circuits of FIGS. 2 and 3 function in the same manner as the circuit of FIG. 1, they are not discussed further.

In the structure of FIG. 1, the transistor inverse collector-to-emitter voltage is equal to approximately twice the input direct-current voltage 100 thus restricting the maximum allowable input voltage to a value half that of the transistor inverse collector-to-emitter voltage rating. Also in FIG. 1, the transistor inverse base-to-emitter voltage is approximately equal to twice the output voltage thus restricting the maximum allowable output voltage to a value half that of the transistor inverse base-to-emitter voltage rating which is generally smaller than the other voltage ratings of the transistor. In addition, the transistor inverse collector-to-base voltage rating may be limiting since the inverse collector-to-base voltage is the sum of the inverse base-to-emitter voltage and the inverse collector-to-emitter voltage. The maximum allowable input and output voltages are, therefore, limited by the transistor voltage ratings. These limitations are also applicable to the circuits of FIGS. 2 and 3. The circuit of FIG. 4 removes the restriction on the magnitude of the output voltage.

Figure 4:
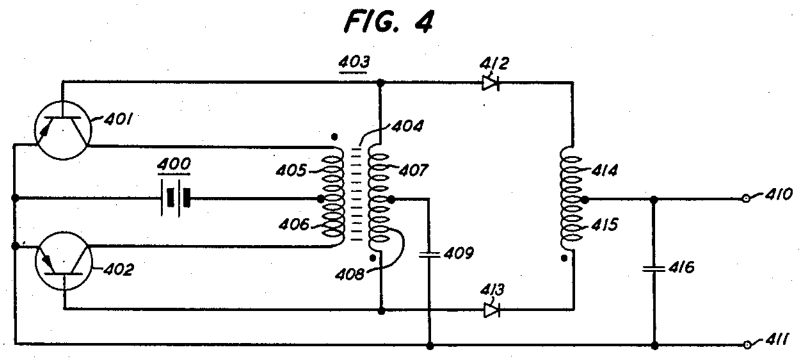
FIGS. 4, 5 and 6 are schematic representations of electrical circuits comprising embodiments of the invention which provide greater output power.

The structure of the embodiment of FIG. 4 is basically the structure of FIG. 1 wherein components 400, 401, 402, 403, 404, 405, 406, 407, 408, 409, 410 and 411 correspond to the components 100, 101, 102, 103, 104, 105, 106, 107, 108, 109, 110 and 111, respectively. Additional transformer winding portion 414 is connected to the base of transistor 401 by asymmetrically conducting device 412. Additional transformer winding portion 415 is connected to the base of transistor 402 by asymmetrically conducting device 413. Additional capacitor 416 is connected across the output terminals 410 and 411.

The operation of the circuit of FIG. 4 is similar to the operation of the circuit of FIG. 1. Asymmetrically conducting devices 412 and 413 are added for isolation purposes. The capacitor 416 provides filtering and capacitor 409 provides the energy storage necessary to reduce switching time. During the half cycle when transistor 401 and asymmetrically conducting device 412 are conducting and transistor 402 and asymmetrically conducting device 413 are non-conducting, the inverse base-to-emitter voltage of transistor 402 is determined by winding portions 407 and 408. It has been found that in the structure of FIG. 4, the determination of the number of turns in winding portions 407 and 408 is a compromise. If the number of turns are too small then the voltage developed across capacitor 409 is insufficient to reduce the switching time appreciably. If the number of turns are too large than either the transistor inverse base-to-emitter or transistor inverse base-to-collector voltage ratings are limiting. The number of turns on winding portions 414 and 415 are considerably larger than the number of turns of winding portions 405 and 406. The larger voltages induced in winding portions 414 and 415 do not appear as inverse base-to-emitter or base-to-collector voltages because of isolation asymmetrically conducting devices 412 and 413. The magnitude of the input voltage of the configuration and, in turn, the magnitude of the output voltage are, therefore, not limited by the transistor inverse voltage ratings. Separation of the capacitor functions results in improved switching times and reduced ripple voltages.

Figure 5:
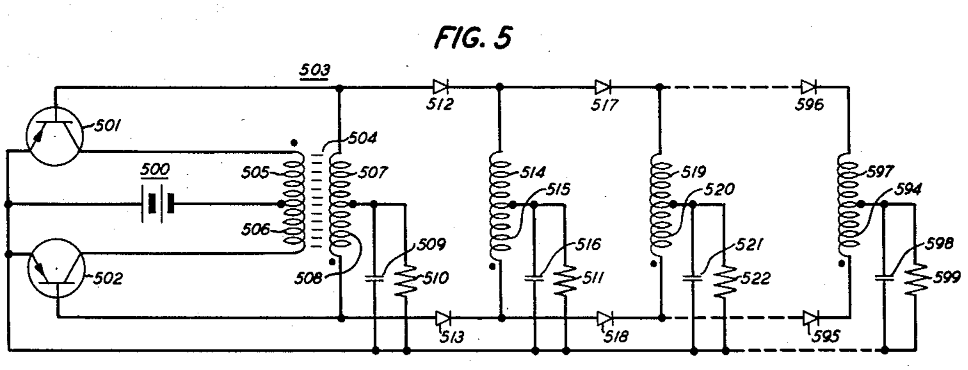

FIG. 5 shows further extensions of the circuit of FIG. 4 wherein *n* output windings may be obtained. Components 500, 501, 502, 503, 504, 505, 506, 507, 508, 509 and 512, 513, 514, 515 and 516 perform similar functions to FIG. 4 components 400, 401, 402, 403, 404, 405, 406, 407, 408 and 409 and 412, 413, 414, 415 and 416, respectively. The operation of the circuit of FIG. 5 is similar to the operation of the circuit of FIG. 4. Each of the resistors 510, 511, 522 and 599 represents a separate load. Asymmetrically conducting devices 512, 513, 517, 518, 595 and 596 perform the same function as asymmetrically conducting devices 412 and 413 in FIG. 4. Winding portions 514, 515, 519, 520, 594 and 597 perform the same function as winding portions 414 and 415 in FIG. 4. It should be understood that although the structures of FIGS. 4 and 5 are shown only in the common emitter embodiments they might equally as effectively be either common base or common collector embodiments.

Figure 6:
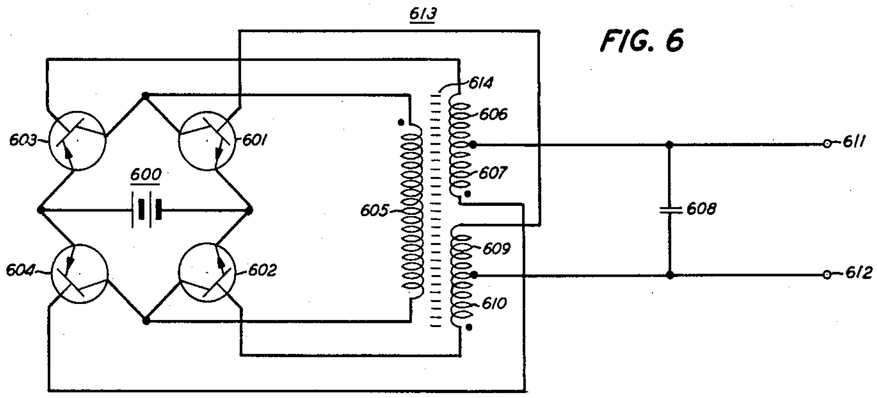

The concepts of the invention disclosed in FIGS. 1–5 may be also applied to bridge converter circuits. One of said many possible embodiments is shown in FIG. 6. In the circuit of FIG. 6, the emitters of n-p-n transistors 601 and 602 are tied to one terminal of the input direct-current supply source 600 while the emitters of p-n-p transistors 603 and 604 are tied to the other terminal of the input direct-current supply source 600. Saturable transformer 613 has a core 614 of saturable magnetic material preferably having a high permeability and substantial rectangular hysteresis loop. One terminal of winding 605 is tied to the collector electrodes of transistors 601 and 603 while the other terminal of winding 605 is tied to the collector electrodes of transistors 602 and 604. The common terminal of winding portions 606 and 607 is connected to output terminal 611 while the common terminal of winding portions 609 and 610 is connected to the output terminal 612. The other terminal of winding portion 606 is connected to the base electrode of transistor 603 while the other terminal of winding portion 607 is connected to the base electrode of transistor 604. The other terminal of winding portion 609 is connected to the base electrode of transistor 601 while the other terminal winding portion 610 is connected to the base electrode of transistor 602. Capacitor 608 is connected across output terminals 611 and 612.

The operation of the circuit of FIG. 6 is as follows: Assuming that transistors 602 and 603 are conducting, current flows from the input direct-current supply source 600 through the emitter-collector path of transistor 603 into the dot of winding 605 through the collector-emitter path of transistor 602 and back to the direct-current input supply source 600. Tracing the induced voltage with the aid of the dot convention, it is noted that the asymmetrically conducting emitter-base junction of transistors 602 and 603 are poled into conduction such that the voltages induced in winding portions 606 and 610 are impressed across capacitor 608. Note that the output terminal 611 is positive with respect to the output terminal 612. Current will continue to flow in winding portion 605 until the core 614 saturates. At saturation no further voltage is induced at winding portions 606 and 610, transistors 602 and 603 are cut off and transistors 601 and 604 are poled into conduction. Current now flows from the direct-current supply source 600 through the emitter-collector path of transistor 604 out of the dot of winding 605 through the collector-emitter path of transistor 601 and back to the direct-current input supply source 600. Once again, tracing the induced voltage with the aid of the dot convention, it is now noted that the base-emitter asymmetrically conducting junctions of transistors 601 and 604 are poled into conduction thus impressing the voltages induced in winding portions 607 and 609 across capacitor 608. Note that, as before, that output terminal 611 is positive with respect to output terminal 612. Current will continue to flow in winding 605 until the core 614 again saturates, turning-off transistors 601 and 604 and turning-on transistors 602 and 603. The cycle then continually repeats itself until the direct-current supply source 600 is removed.

It should be noted that capacitor 608 provides the dual function of filtering and energy storage. It should also be noted that the embodiment of FIG. 6 makes possible the combination of the induced voltages into a single output. This combination thus provides a current feedback bridge converter configuration with multiple output windings which requires only a single transformer with a minimum number of turns.

It should be understood that combinations of n-p-n and p-n-p transistors, other than those shown, could be used equally as effectively in the embodiments of FIGS. 1–6. In addition, although each of the preferred embodiments of FIGS. 1–6 comprises a transformer having a core of saturable magnetic material the invention will also operate if a transformer other than the saturable type is used. However, it has been found that superior switching action is achieved when a transformer of the saturable type is employed.

Since changes may be made in the above-described arrangement and different embodiments may be devised by those skilled in the art without departing from the spirit and scope of the invention, it is to be understood that the matter contained in the foregoing description and accompanying drawings is illustrative of the application of the principles of the invention and is not to be construed in a limiting sense.

What is claimed is:

1. An oscillator comprising a transistor having base, collector, and emitter electrodes, a source of input potential, a load, a transformer having primary and secondary windings, means serially connecting said source of input potential, the emitter and collector electrodes of said transistor, and said primary winding, and a bidirectional and substantially impedance free load current feedback path serially connecting said load, the emitter and base electrodes of said transistor, and at least a portion of said secondary winding.

2. A converter circuit comprising first and second transistors each having base, collector, and emitter electrodes, a source of input potential, a load, a transformer having primary and secondary windings, said primary and secondary windings each having at least first and second portions, means serially connecting the emitter-collector path of said first transistor with said first portion of said primary winding and said source of input potential, means serially connecting the emitter-collector path of said second transistor with said second portion of said primary winding and said source of input potential, a first substantially impedance free load current feedback path serially connecting said load, the emitter-base path of said first transistor, and said first portion of said secondary winding, and a second substantially impedance free load current feedback path serially connecting said load, the emitter-base path of said second transistor, and said second portion of said secondary winding, whereby a load current feedback path is provided for said first and second transistors and the switching time of said first and second transistors is reduced.

3. A converter comprising first and second transistors each having base, collector, and emitter electrodes, a transformer having at least a primary, first, and second windings, each of said primary, first, and second windings having at least first and second portions, a source of input potential, a load, means serially connecting the emitter-collector path of said first transistor with said first portion of said primary winding and said source of input potential, means serially connecting the emitter-collector path of said second transistor with said second portion of said primary winding and said source of input potential, a first feedback path serially connecting said first portion of said first winding and the emitter-base path of said first transistor, a second feedback path serially connecting said first portion of said second winding and the emitter-base path of said first transistor, a third feedback path serially connecting the emitter-base path of said second transistor and said second portion of said second winding, a fourth feedback path serially connecting the emitter-base path of said second transistor and said second portion of said second winding, a load, and means connecting said load to said second winding such that said first and said second portions of said second winding alternately supply energy to said load, whereby the magnitudes of the input and load potentials are not limited by the transistor inverse voltage ratings.

4. A converter in accordance with claim 3 wherein said transformer has a core with a substantially rectangular hysteresis loop and a first capacitor is serially connected in said first and third feedback paths between the juncture of said first and second winding portions of said first winding and the emitter-base paths of said first and second transistors, and a second capacitor is serially connected in said second and fourth feedback paths between the juncture of said first and second winding portions of said second winding and the base-emitter paths of said first and second transistors, whereby the switching time of said transistors is improved and the ripple voltage appearing across the load is reduced.

5. A converter circuit comprising first, second, third, and fourth transistors, each having base, collector, and emitter electrodes, a source of input potential, a load, a transformer having primary, first, and second windings, said first and second windings each having at least first and second portions, means serially connecting said input source, the collector-emitter path of said first transistor, said primary winding, and the collector-emitter path of said second transistor, means serially connecting said input source, the collector-emitter path of said third transistor, said primary winding, and the collector-emitter path of said fourth transistor, a first direct-current feedback path comprising said load, said first portion of said second winding, the base-emitter path of said second transistor, said source of input potential, the base-emitter path of said first transistor, and said first portion of said first winding, and a second current feedback path comprising said load, said second porton of said second winding, the base-emitter path of said fourth transistor, said input source, the base-emitter path of said third transistor, and said second portion of said first winding, whereby a bridge converter circuit employing a single transformer with a minimum number of turns and improved transistor switching times may be provided.

References Cited in the file of this patent

UNITED STATES PATENTS

| | | |
|---|---|---|
| 2,683,226 | Kerpchar | July 6, 1954 |
| 2,872,582 | Norton | Feb. 3, 1959 |
| 2,950,446 | Kumez et al. | Aug. 23, 1960 |
| 3,031,629 | Kadri | Apr. 24, 1962 |